(12) United States Patent
Nanda et al.

(10) Patent No.: US 8,078,870 B2
(45) Date of Patent: Dec. 13, 2011

(54) HTTP-BASED AUTHENTICATION

(75) Inventors: Arun K. Nanda, Sammamish, WA (US);
Hervey Wilson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/465,725

(22) Filed: May 14, 2009

(65) Prior Publication Data

US 2010/0293385 A1 Nov. 18, 2010

(51) Int. Cl.
*H04L 9/32* (2006.01)
(52) U.S. Cl. .......................... 713/166; 713/155; 726/4
(58) Field of Classification Search ............... 713/155, 713/159, 160, 166, 170–176; 726/4, 5, 9, 726/17–20
See application file for complete search history.

(56) References Cited

U.S. PATENT DOCUMENTS

| 6,986,047 | B2 * | 1/2006 | Giles et al. .................. 713/175 |
| 7,434,252 | B2 | 10/2008 | Ballinger et al. |
| 2006/0264202 | A1 | 11/2006 | Hagmeier et al. |
| 2006/0282886 | A1 | 12/2006 | Gaug |
| 2007/0143835 | A1 | 6/2007 | Cameron et al. |
| 2008/0082638 | A1 | 4/2008 | Kaler et al. |
| 2008/0141028 | A1 | 6/2008 | Wei et al. |
| 2008/0168273 | A1 | 7/2008 | Chung et al. |
| 2008/0178272 | A1 | 7/2008 | Gajjala et al. |
| 2008/0289039 | A1 | 11/2008 | Rits et al. |
| 2008/0301784 | A1 * | 12/2008 | Zhu et al. ...................... 726/5 |
| 2009/0013087 | A1 | 1/2009 | Lorch et al. |
| 2009/0252159 | A1 * | 10/2009 | Lawson et al. ............. 370/352 |
| 2009/0319795 | A1 * | 12/2009 | Sharif et al. ................ 713/176 |
| 2009/0328178 | A1 * | 12/2009 | McDaniel et al. ............. 726/9 |
| 2010/0037303 | A1 * | 2/2010 | Sharif et al. .................... 726/6 |
| 2010/0251345 | A1 * | 9/2010 | James et al. .................... 726/5 |

OTHER PUBLICATIONS

Adams Holt, "Best Practices for Web Services, Part 12: Web Services Security, Part 2", Retrieved at<<http://www.ibm.com/developerworks/webservices/library/ws-best12/>>, Mar. 30, 2004, pp. 6.
Cibraro Pablo M. "Authenticating Users with Supporting Tokens in WCF", Retrieved at<<http://weblogs.asp.net/cibrax/archive/2008/01/22/authenticating-users-with-supporting-tokens-in-wcf.aspx>>, pp. 6.
"Security Guide", Retrieved at<<http://download.oracle.com/docs/cd/E13159_01/osb/docs10gr3/security/message_level_cust_auth.html>>, Oracle, pp. 9.
"Writing Advanced Web Services Applications", Retrieved at<<http://documentation.softwareag.com/webmethods/exx8/webservices/webServicesWrapper_writeAppsAdv.htm>>, pp. 7.
Lacey Pete, "Message Level Security and REST", Retrieved at<<http://72.249.21.88/nonintersecting/?year=2007&monthnum=05&day=25&name=message-level-security-and-rest&page>>, May 25, 2007, pp. 6.
Berners-Lee et al. "Requst for Comments 1945; Hypertext Transfer Protocol—HTTP/1.0", Network Working Group, May 1996, pp. 1-60, Retrieved at<<http://www.ietf.org/rfc/rfc1945.txt>>.
"International Search Report", Mailed Date: Nov. 30, 2010, Application No. PCT/US2010/034402, Filed Date: May 11, 2010, pp. 9.

* cited by examiner

*Primary Examiner* — Krisna Lim
(74) *Attorney, Agent, or Firm* — Gary Mager

(57) ABSTRACT

A system and method for authenticating an HTTP message. A relying party may respond to a request from a requester by sending an HTTP message with authentication specifications to the requester. The requester responds with a new request that adheres to a scheme specified by the relying party. A framework allows for a security token to be located in an HTTP header or a message body, with various options such as fragmenting the token available. An option allows for cryptographically binding the security token to the body of a message. An authentication framework provides for an implementation by an HTTP stack or by an application.

20 Claims, 8 Drawing Sheets

HTTP-BASED AUTHENTICATION

TECHNICAL FIELD

The present invention relates generally to network technology, and, more particularly, to the use of HTTP to authenticate requests in a networked environment.

BACKGROUND

Computer networks are subject to a variety of security breaches. One such type of breach occurs when a user or computer system falsely identifies itself, in order to access resources that it is not authorized to access, or to otherwise avoid being correctly associated with a request. To facilitate request authentication, a request for service to a party providing a resource or service, hereinafter referred to as a "relying party," includes the identity of the requester in a manner such that the relying party can verify the authenticity of the identity. Request authentication is the process of verifying the identity of the sender of a request. Authentication provides some level of security that each party's identification is accurate. The identity of the requester forms the basis for access control decisions made by the relying party.

One type of request authentication includes the use of a username and password. A stronger type of authentication involves the use of a security token. Some types of security tokens are issued by a trusted identity provider. Possession of a security token serves to provide proof of identity for the possessing party. Some security tokens have embedded cryptographic keys for stronger security.

In one type of interaction, a requester acquires a security token from an identity provider. The requester then presents the security token with a service request to a party providing a resource or service. The resource provider has a trust relationship with the identity provider that serves as assurance of the authenticity of the security token.

Representational state transfer (REST) is a style of software architecture for distributed systems such as the World Wide Web. REST generally refers to an interface that transmits domain-specific data over HTTP without an additional messaging layer such as SOAP. HTTP provides an interface including methods, such as GET, POST, UPDATE, and DELETE, that conform to a "RESTful" architecture. One aspect of the REST architecture is the support of stateless servers, in which each message includes the information necessary to understand the message, freeing a server from needing to remember communication state between messages. This facilitates scaling of servers, such as in a server farm.

RFC 2617, available at <<http://www.ietf.org/rfc/rfc2617.txt>>, describes a BASIC authentication scheme in which a username and password may be passed in an HTTP header field. The RFC describes this scheme as "not considered to be a secure method of user authentication, as the user name and password are passed over the network in an unencrypted form." The RFC also describes a "Digest Access Authentication" scheme, in which a hash of a username, password, a nonce value, the HTTP method, and the requested URI is used. The RFC states that the digest scheme " . . . suffers from many known limitations."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to provide an HTTP message authentication framework that enables an application to authenticate an HTTP request. The framework provides an application with a mechanism to implement a variety of request authentication schemes, taking advantage of HTTP stack implementations. An example embodiment includes a protocol with a set of HTTP headers and associated semantics. Methods of generating and processing HTTP messages are described, as well as variations of an interaction between a requester and a relying party.

In an example embodiment, a requester receives from a server a server message including one or more HTTP headers that have authentication specifications. In response, the requester may generate a request message that complies with the authentication specifications. In one embodiment, the request message includes a message body, a security token (ST), an HTTP header that specifies a location of the security token. The request message may include an HTTP header that includes a digest of the message. The security token may be located in one or more HTTP headers or in the message body. If the security token is located in multiple HTTP headers, it may be fragmented across the headers. If the security token is located in the message body, it may be the entire body, an HTML form field, or in an XML element. In one embodiment, the digest includes a cryptographic representation of the message body and at least one HTTP header, or portions thereof.

In one embodiment, a requester determines the location of the security token based on the size of the security token. If it is too long to fit in one HTTP header, it may be fragmented across multiple headers. If it is too long to fit in multiple HTTP headers, it may be located in the message body.

In one embodiment, a server receiving the request message may extract the security token based on the token location header specification. The security token may be in one HTTP header, fragmented across multiple HTTP headers, or in the message body.

In one embodiment, the server sends the requester a signature specification, and the requester includes a digital signature that complies with the signature specification in a security header.

In one embodiment, the server responds to the requester with a message that includes a context token. In a subsequent request, the requester may include the context token in an HTTP header instead of including the security token.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
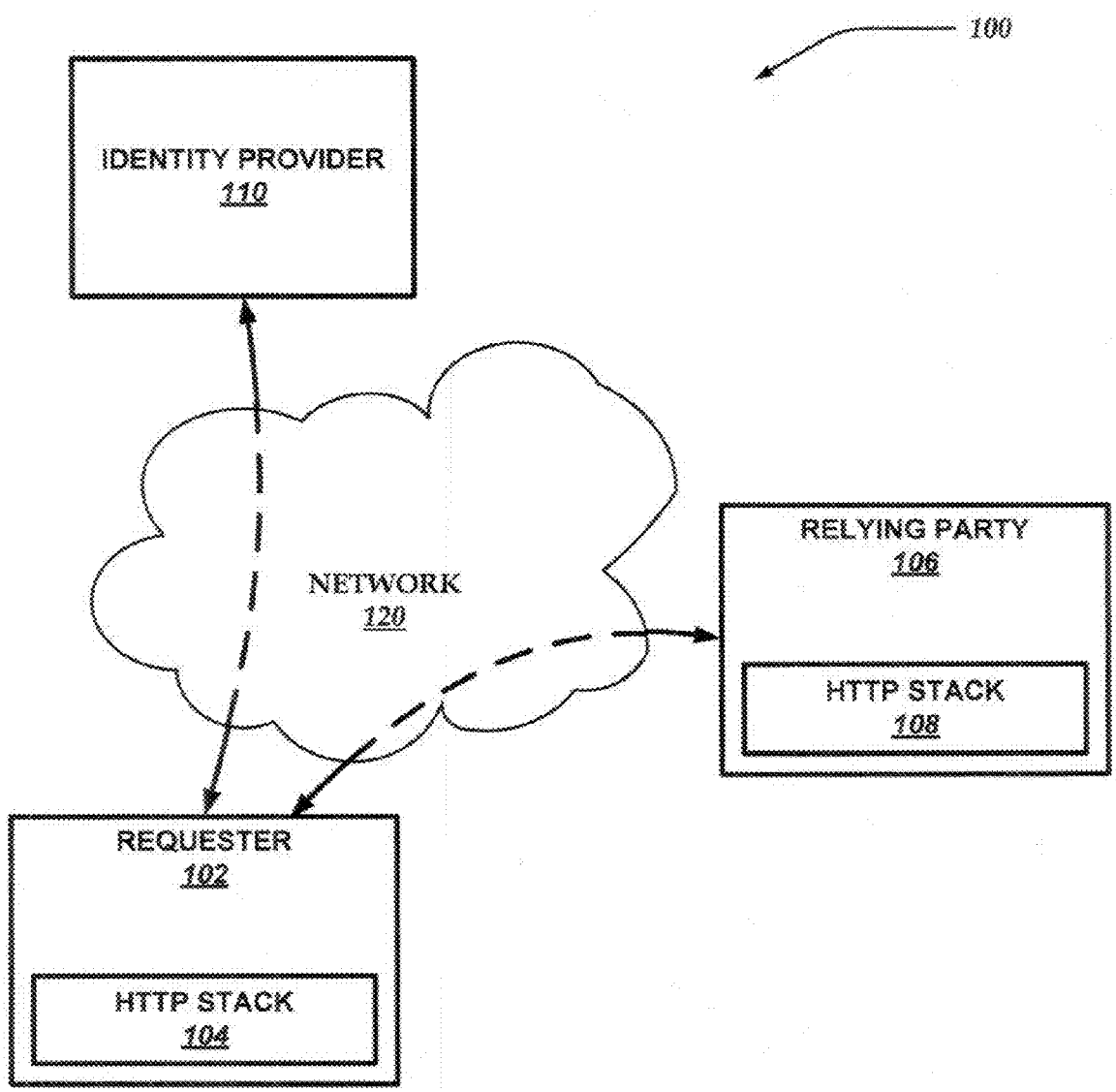
FIG. 1 is a block diagram of an example environment in which embodiments may be practiced.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "authenticate" refers to confirming that facts or claims are true, to an acceptable degree of certainty. Authenticating a user or a user's identity applies to confirming that the stated identity of the user is sufficient and accurate. Authenticating a request from a user may include confirming that the identity information included with the request is accurate, that the request originated with or is authorized by the identified user, that the request has not been improperly modified, or that other information in the request is accurate. Authentication has an associated degree of certainty, allowing for a situation in which information has been authenticated yet may be inaccurate.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an environment 100 in which embodiments may be practiced. FIG. 1 provides a basic understanding an example environment, though many configurations may be employed and many details are not illustrated in FIG. 1. As illustrated in FIG. 1, an example environment 100 includes a requester 102. Requester 102 may be a client computing device, process, or any component that requests resources or services from a remote service provider. In the example embodiment, requester 102 includes an HTTP stack 104. An HTTP stack may receive, process, generate, or send hypertext protocol (HTTP) messages, in accordance with HTTP standards and with at least some of the mechanisms described herein.

Figure 2:
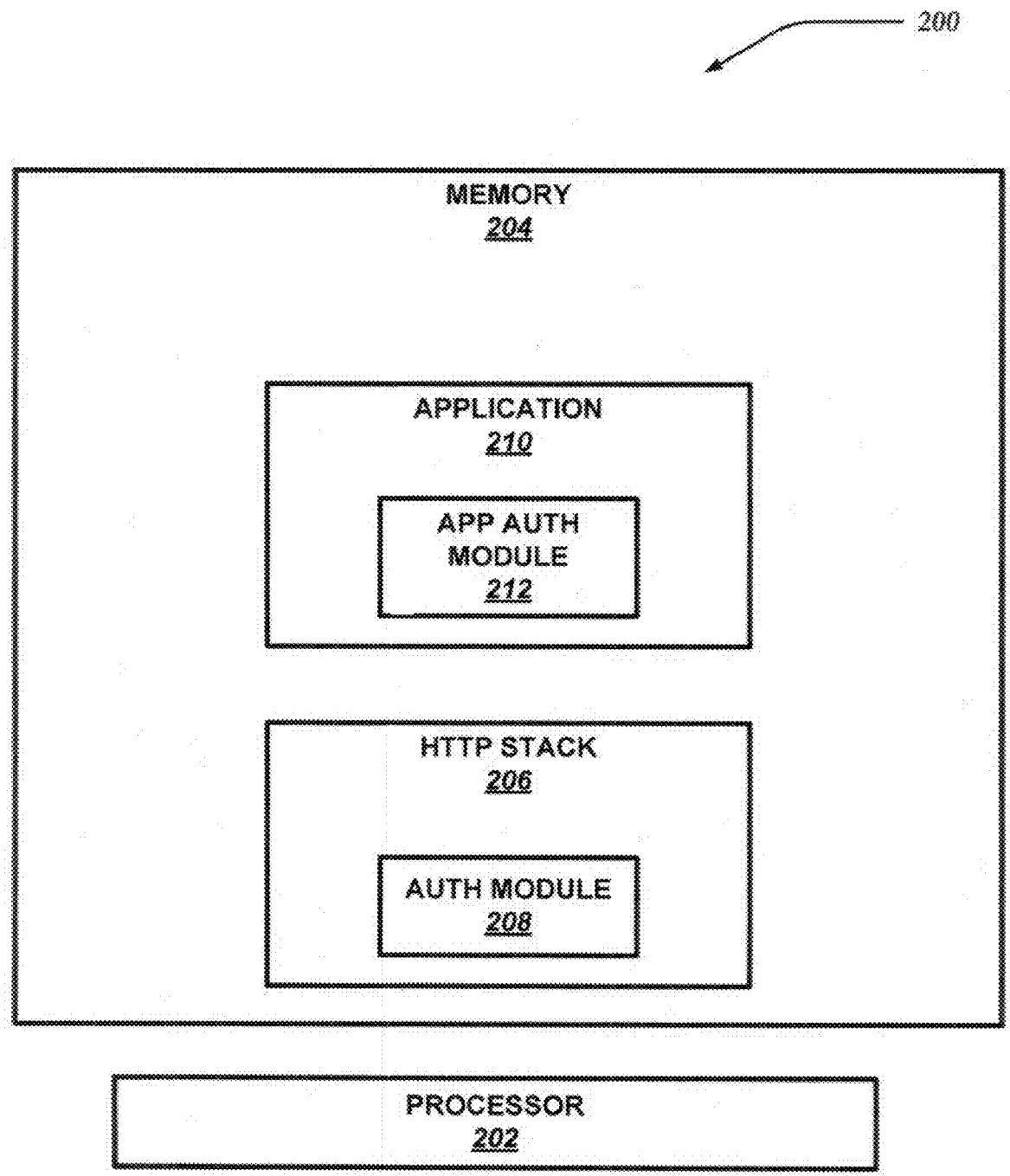
FIG. 2 is a block diagram illustrating an example embodiment of a computing system that may be employed to implement a relying party.

Example environment 100 includes relying party 106. Relying party 106 may be a computing device, server, or a server farm that includes multiple servers. FIG. 2 illustrates an example implementation of relying party 106.

In the illustrated example embodiment, relying party includes HTTP stack 108. HTTP stack 108 performs actions as described for HTTP stack 104, though the implementation of HTTP stack 108 and HTTP stack 104 may differ, and the functions provided by each may differ.

In one embodiment, requester 102 sends one or more requests to relying party 106. A request may include some type of identifying information. The request may be a request for a resource or service. As used herein, a request for a service is considered to be a request for a resource. Relying party 106 may process the request and determine whether the request includes information to sufficiently authenticate the request or a user of requester 102. The information may be in a specific format, and is referred to as security credentials. If the security credentials are not included or are insufficient, relying party 106 may reject the request and instruct requester 102 to provide sufficient security credentials. This process is discussed in more detail herein.

Example environment 100 includes identity provider 110. Identity provider may be a network entity that issues security credentials to requester 102. The security credentials may represent claims about requester 102 that can be trusted by relying party 106. Thus, identity provider 110 is considered to be a trusted party by relying party 106. In one embodiment, the security credentials include a security token (ST), and identity provider 110 includes a security token service (STS) that provides security tokens.

One type of security token includes data that represents a collection of one or more claims about an entity, such as user of requester 102. The claims may be considered as assertions that information associated with the claimer is accurate. This may include, for example, a name, identifier, key, group membership, a privilege, a capability, or the like. This type of security token is referred to herein as a "direct security token."

A second type of security token includes a reference to a direct security token, the reference identifying or enabling access to the direct security token. This type of reference to a direct security token is referred to herein as an indirect security token. A uniform resource identifier (URI) is an example of an indirect security token, if it references a direct security token. As used herein, the term "security token" may refer to a direct security token or an indirect security token, unless the context clearly indicates one specific type.

Requester 102 may communicate with relying party 106 or identity provider 110 through a network 120. Network 120 may include a local area network, a wide area network, or a combination thereof. In one embodiment, network 120 includes the Internet, which is a network of networks. Network 120 may include wired communication mechanisms, wireless communication mechanisms, or a combination thereof. Communications between requester 102, relying party 106, or identity provider 110, with each other or other computing devices may employ one or more of various wired or wireless communication protocols, such as IP, TCP/IP, UDP, HTTP, SSL, TLS, FTP, SMTP, WAP, Bluetooth, or WLAN.

FIG. 1 is only an example of a suitable environment and is not intended to suggest any limitation as to the scope of use or functionality of the present invention. Thus, a variety of system configurations may be employed without departing from the scope or spirit of the present invention. For example, any of the functions of relying party 106 or identity provider 110 may be combined into one or more computing devices, distributed, or replicated among multiple computing devices in a variety of ways. Similarly, the functions of requester 102 may be configured in a variety of ways among one or more computing devices. In one embodiment, functions of relying party 106 and identity provider 110 may be combined in one or more computing devices.

In one embodiment, each of requester 102, relying party 106, and identity provider 110 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows family of operating systems, by Microsoft Corporation, of Redmond, Wash., are examples of operating systems that may execute on a computing device of a development system.

FIG. 2 is a block diagram illustrating an example embodiment of a computing system 200 that may be employed to implement relying party 106, or portions thereof. In various embodiments, system 200 may be implemented with one or more servers or other computing devices configured in a variety of ways.

As illustrated, computing system 200 includes one or more processors 202, which perform actions to execute instructions of various computer programs. In one configuration, processor 202 may include one or more central processing units, one or more processor cores, an ASIC, or other hardware processing components and related program logic. In the illustrated embodiment, computing system 200 includes memory 204, which may comprise volatile or non-volatile memory. Computing system 200 may also include a network communications unit, which performs actions to send or receive messages or signals to remote devices across a network.

In the illustrated embodiment, computing system 200 includes HTTP stack 206 and one or more applications 210, stored within memory 204. HTTP stack 206 may be HTTP stack 108 (FIG. 1). In one embodiment, HTTP stack 206 includes authentication module 208, which performs actions to authenticate a received request. In some embodiments, HTTP stack 206 does not include authentication module 208.

In one embodiment, computing system 200 includes application 210. Application 210 may perform various services, provide access to one or more resources, or perform other actions in response to a request. Examples of application 210 include a Web server, an FTP server, and a mail server. Application 210 may include application authentication module 212. Application authentication module 212 performs actions to authenticate a received request, though not necessarily the same actions as authentication module 208.

Figure 3:
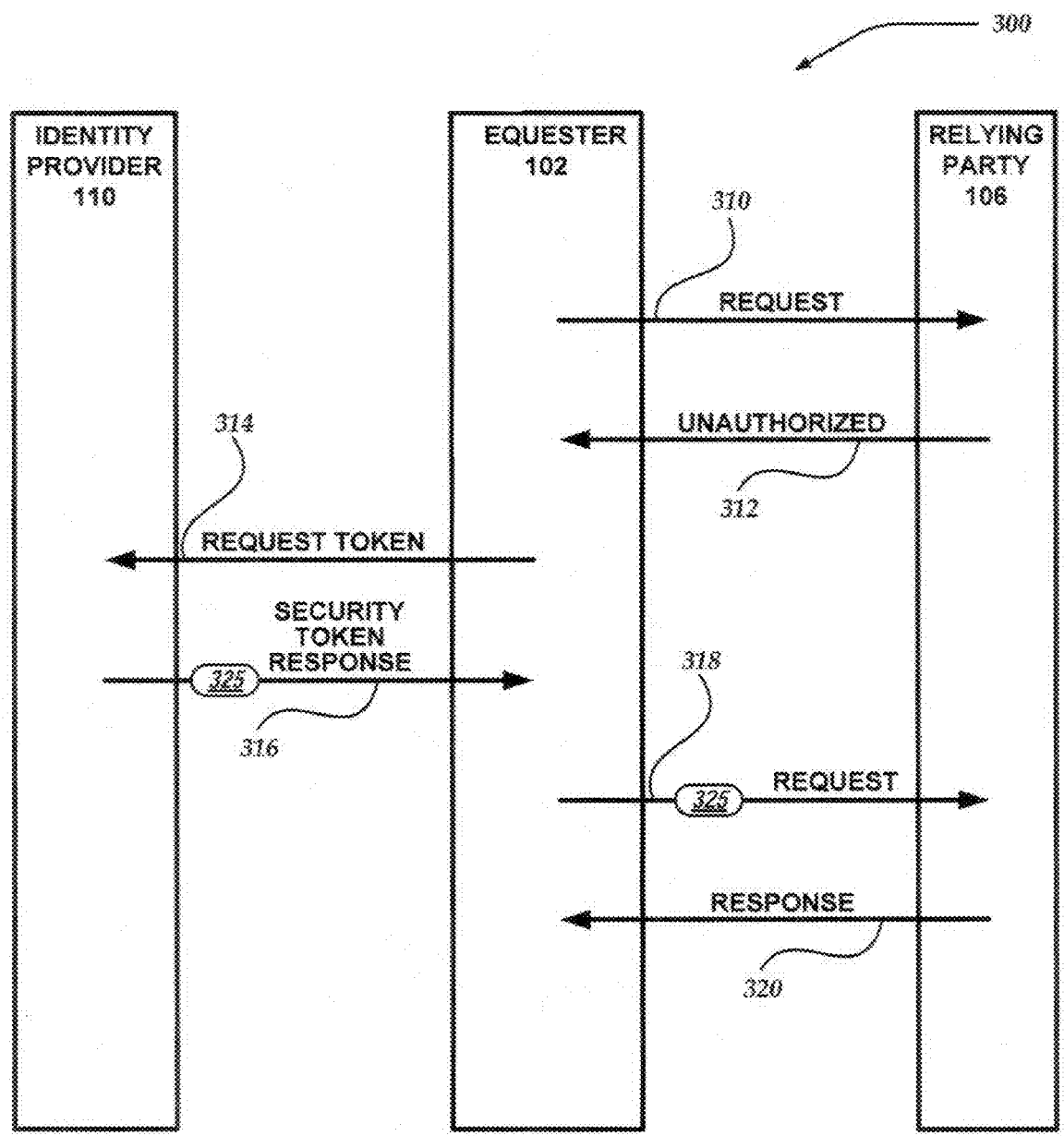
FIG. 3 illustrates an example environment in which embodiments may be practiced.

FIG. 3 illustrates an example environment 300 in which embodiments may be practiced. Environment 300 may exist in conjunction with environment 100 of FIG. 1, or a variation thereof. As illustrated, environment 300 includes requester 102, relying party 106, and identity provider 110. Requester 102 is in direct or indirect communication with each of relying party 106 and identity provider 110. The communication may be direct or over a network, such as network 120 (FIG. 1).

Arrows in FIG. 3 represent messages that are exchanged between the illustrated components. Moreover, in one embodiment, the reference numbers of the messages correspond to a temporal sequence in a direction from the top toward the bottom of the figure, though in various embodiments, the sequence differs. In one embodiment, each of the illustrated messages is an HTTP message, the content of which are described in more detail below.

Figure 4:
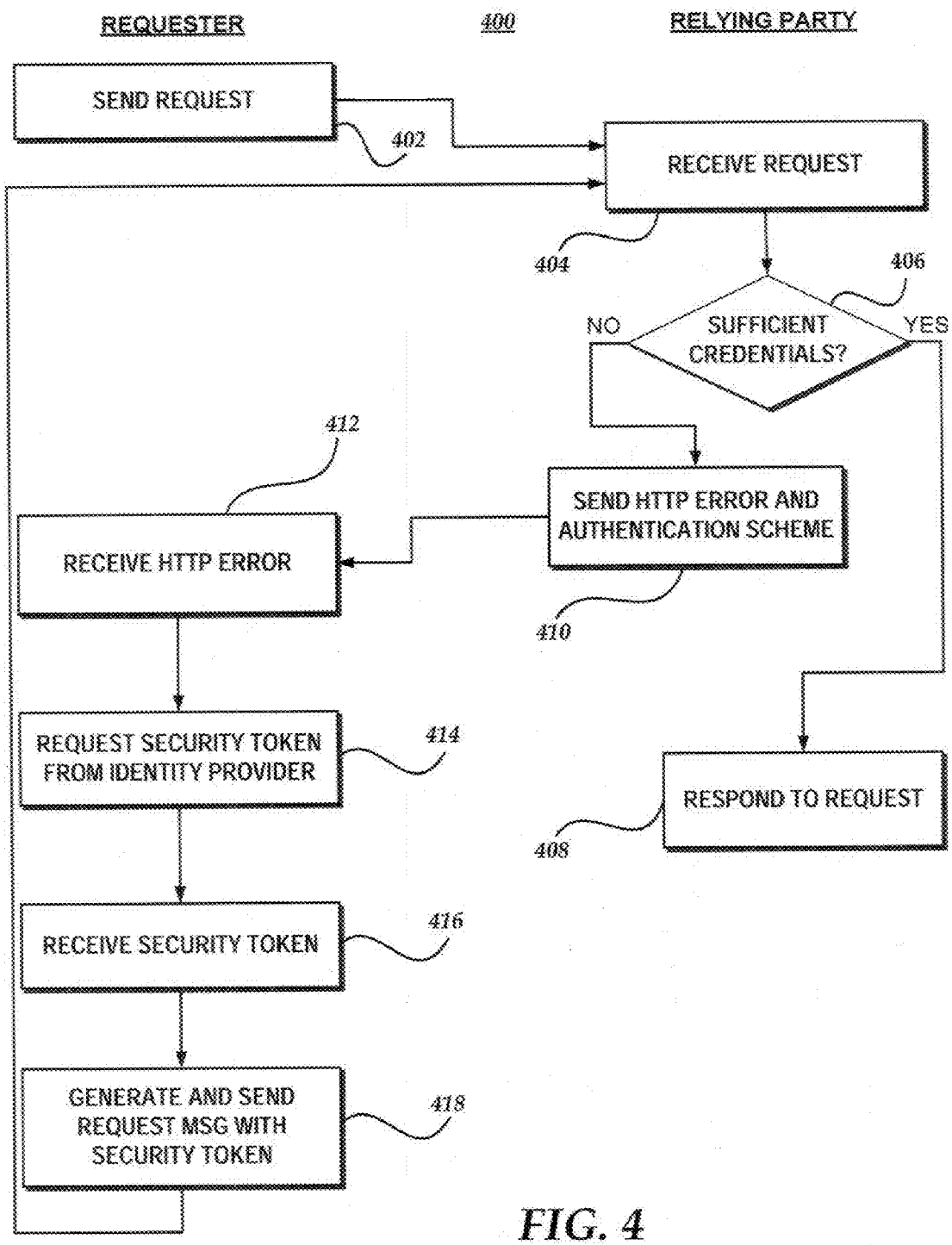
FIG. 4 is a flow diagram illustrating an example embodiment of a process of employing HTTP headers to authenticate a requester.

The messages of FIG. 3 are discussed in conjunction with FIG. 4. FIG. 4 is a flow diagram illustrating an example embodiment of a process 400 of employing HTTP headers to authenticate a requester. Some of the actions of process 400 are performed by requester 102 (FIG. 1), and are represented in the left column of FIG. 4 under the header "Requester." Other actions of process 400 are performed by relying party 106, and are represented in the right column of FIG. 4 under the header "Relying Party." Some of the actions of process 400 relate to sending or receiving messages illustrated in FIG. 3. The following discussion references messages of FIG. 3.

The illustrated portions of process 400 may be initiated at block 402, where requester 102 sends a request message to relying party 106 (Request message 310). In one embodiment, request message 310 is a request for a resource for which access is protected by an authentication process. The process may flow from block 402 to block 404, where relying party 106 receives the request message 310. Process 400 may flow from block 404 to decision block 406, where a determination is made of whether the request is sufficiently authenticated. In one embodiment, this includes determining whether the request includes valid and sufficient security credentials. A determination of sufficiency may be based on a configuration of relying party 106. In one embodiment, the determination of block 406 includes determining whether the request includes a security token and adheres to a configured scheme. The determination may also be based on the value of the requested resource, location or configuration of the requester, time of day, or other factors. Further details of the actions of block 406 are discussed herein.

If, at decision block 406, it is determined that the request is sufficiently authenticated, the process may flow to block 408, where relying party 106 may send a response message 320 to requester 102. In some configurations, response message 320 may indicate a successful response. It may include a resource, an indication that a resource is available, an indication that a service has been or will be provided, data that facilitates obtaining the resource, or another response in accordance with the request. In some configurations, response message 320 may indicate a rejected request for a reason other than authentication. For example, a request may be properly authenticated, but the user may not be authorized to access the resource. The resource may be unavailable for other reasons. The process may flow from block 408 to a program exit or return to a calling program.

If, at decision block 406, it is determined that there are not sufficient security credentials included with the request message, process 400 may flow to block 410, where an HTTP error response message may be generated and sent from relying party 106 to requester 102. In one embodiment, the HTTP error response message is an HTTP "unauthorized" message 312. This may be an HTTP 401 error message including a "WWW-Authenticate" response header. The message may include data indicating a specification of security credential that is required, or a protocol to be adhered to when sending one or more security credential. The protocol is referred to as a "scheme," and in the particular case of a scheme that uses one or more HTTP headers, it is referred to as an "HTTP scheme."

Process 400 may flow from block 410 to block 412, where requester 102 receives "unauthorized" message 312. Though in some environments requester 102 may possess the sufficient security credentials or be able to generate them, in the illustrated environment, in response to receiving the "unauthorized" message 312, the process flows to block 414, where requester 102 may attempt to acquire sufficient security credentials, in conformance with a scheme identified by relying party 106 in "unauthorized" message 312. In one embodiment, at block 414, requester 102 may request a security token from a trusted identity provider, such as identity provider 110. The request may be in the form of a request ST message 314 that is sent to identity provider 110. Request ST message 314 may include security credentials or other data that may be used to authenticate a user of requester 102.

In some environments, in response to receiving request ST message 314, identity provider 110 may determine that requester 102 has not provided sufficient identification data, or is otherwise not authorized to receive a security token. This action is not illustrated in FIG. 4. Example process 400 illustrates an environment in which identity provider 110 returns the requested security token to requester 102. As shown, process 400 flows to block 416, where requester 102 receives ST response message 316, which includes security token 325. In some embodiments, a security token includes one or more cryptographic keys. Examples of key-bearing security tokens include Kerberos v5 tickets with session keys and SAML v1.1 or v2.0 tokens with holder-of-key subject confirmation.

In one embodiment, the request ST message 314 and the ST response message 316 conform to at least some of the message protocols described herein. For example, a requester may insert into ST request message 314 a token location header and a token header as described herein. The message may further include a digest header and a digital signature. An example of such a message is provided herein.

In response to receiving a security token at block 416, the process may flow to block 418, where requester 102 may generate and send request message 318 to relying party 106. Request message 318 may include a request similar to the request of request message 310. However, request message 318 may include the security token 325 received from identity provider 110. In one embodiment, request message 318 is similar to request message 310 with additional HTTP headers that provides authentication data. The process may flow from block 418 to block 404, where relying party 106 receives request message 318.

At block 404, in response to receiving the request message 318, relying party 106 may process the message to determine whether the request includes sufficient identification credentials and conforms to the configured authentication scheme, as discussed with regard to request message 310. If the identification credentials are considered to be insufficient, process 400 may flow to block 410, where replying party may send another unauthorized message 312. If, at decision block 406, it is determined that the security credentials are sufficient, the process may flow to block 408, where a response is sent, as discussed above. FIG. 3 illustrates an example sequence of messages, in which a first request message is insufficient, and a second request message is sufficient. The example sequence of messages illustrates the following sequence of messages.

Request message 310.
Unauthorized message 312.
Request ST message 314.
ST response message 316.
Request message 318 (with security token).
Response message 320.

In one embodiment, an environment may result in a sequence of messages as follows.

Request ST message 314.
ST response message 316.
Request message 318 (with security token).
Response message 320.

In the above example sequence, requester 102 may, at block 414, send request ST message 314; at block 416, requester 102 may receive security ST response message 316; in response, at block 418, requester 102 may generate and send request message 318. Relying party 106 may then send response message 320 at block 408. This sequence may occur, for example, in an environment in which requester 102 has previously received unauthorized message 312 in response to a prior request, or has otherwise been configured to obtain an appropriate security token and send it with an appropriate scheme in a request message. Variations of process 400 may occur that include sending the illustrated messages, or a portion thereof, in yet other sequences.

Figure 5:
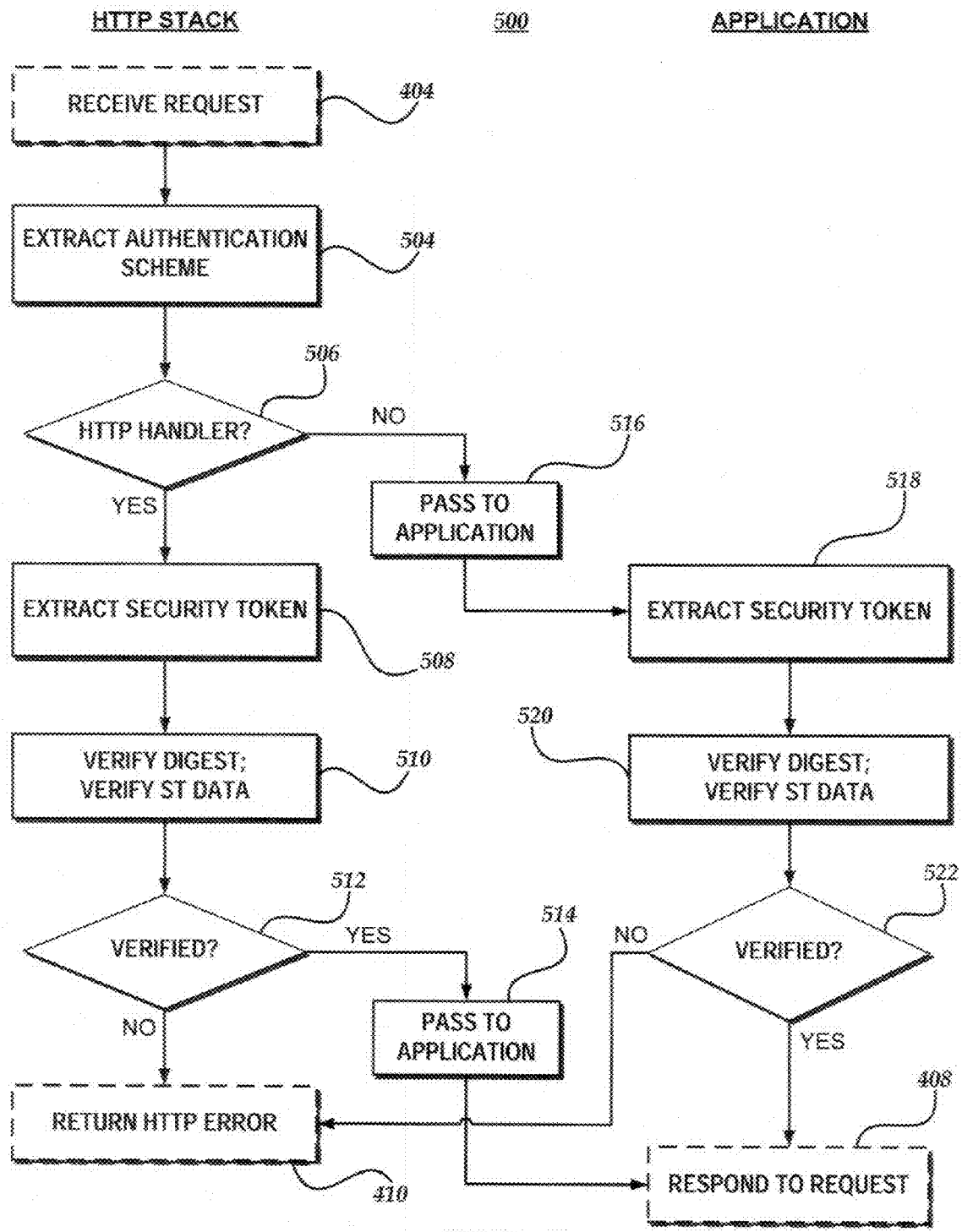
FIG. 5 is a flow diagram illustrating, in further detail, some of the actions of FIG. 4.

FIG. 5 is a flow diagram illustrating an example implementation of decision block 406 of FIG. 4. Some of the actions of decision block 406 may be performed by HTTP stack 206 (FIG. 2) of relying party 106 (FIG. 1), and are represented in the left column of FIG. 5 under the header "HTTP Stack."

Other actions of decision block 406 may be performed by authentication module 212 of application 210, and are represented in the right column under the header "Application." FIG. 5 includes blocks 404, 410, and 408 of FIG. 4 in dashed lines for context; though they are not included in the actions of decision block 406 in the illustrated embodiment. The actions of decision block 406 illustrated in FIG. 5 are referred to herein as process 500.

As illustrated in FIG. 5, processing may flow from block 404 to block 504, where a specification of an authentication scheme may be extracted from an HTTP header of an HTTP message. Request message 318 is one example of such an HTTP message. In one embodiment, the specification may be any scheme name configured in relying party 106.

Process 500 may flow from block 504 to decision block 506, where a determination is made of whether HTTP stack 206 is configured with a handler corresponding to the specified authentication scheme. The framework described herein allows process 500 to be performed in a relying party with an HTTP stack handler corresponding to the specified authentication scheme or with an HTTP stack that is not so configured.

Figure 7:
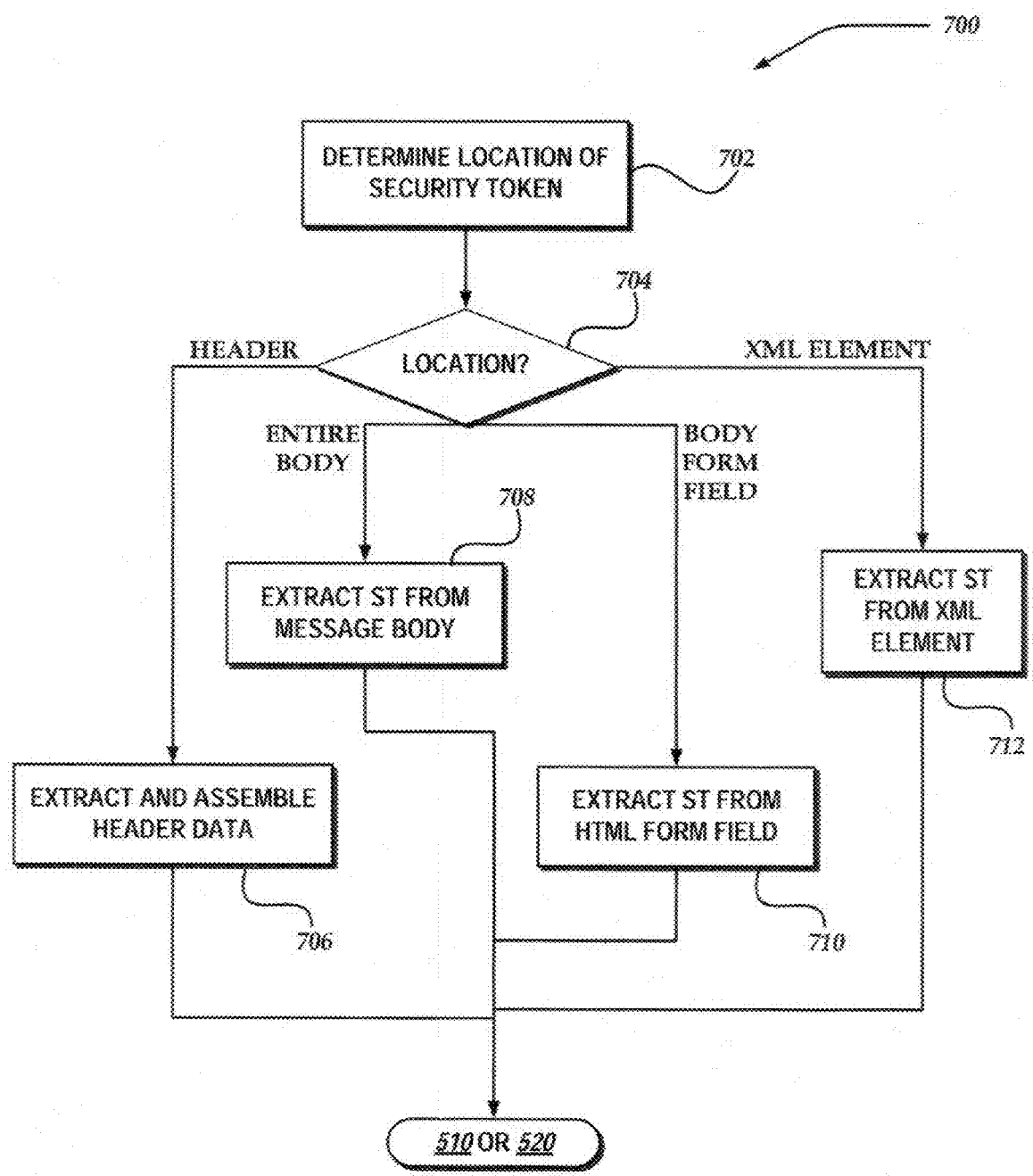
FIG. 7 is a flow diagram illustrating a process of extracting a security token from an HTTP message, in accordance with an example embodiment.

If, at decision block 506, it is determined that HTTP stack 206 is configured with a corresponding handler, the process may flow to block 508, where a security token may be extracted from the received message. As described herein, the framework described herein allows a security token to be located in one or more HTTP headers or in a body of the request message. The actions of block 506 include determining a location of the security token, extracting the security token, and assembling fragments of the security token if there is more than one. FIG. 7 illustrates, in further detail, some of the actions of block 508.

The process may flow from block 508 to block 510, where verification of the security token may be performed. In one embodiment, the actions of block 510 include verifying that a security token is properly associated with the request in which it is received. In one embodiment, the message may include a digest of the request message, or portions thereof. This may include the message body, the security token, and selected portions of the HTTP headers. The digest may include a hash of the designated portions of the message. The actions of block 510 may include verifying that the digest accurately represents the message body and selected portions of the HTTP headers. Verifying the security token may include generating a digest and verifying that it matches a digest included with the security token. In one embodiment, the actions of block 510 include verifying a digital signature that covers at least the digest. The signature may use a cryptographic key embedded in the security token. This serves to strongly associate the security token with the message.

Verification of the security token may include verifying that the security token was issued by a trusted identity provider, such as identity provider 110 of FIG. 1. The actions of block 510 may include verifying that any claims represented by the security token are sufficient, based on a configuration of the relying party, or additional verification of security token data, as configured. This may include virtually any type of verification that may be configured.

The process may flow to decision block 512, where a determination is made of whether the security token and associated data are properly verified. If the verification fails, the process may flow to block 410 of process 400, and continue as described herein. If the verification succeeds, the process may flow to block 514, where the request message, or portions thereof, is passed to application 210. Application 210 may process the message in a variety of ways, including the actions of block 408, of process 400, where it may continue as described herein.

In one embodiment, the HTTP stack may not be configured to extract and verify the security token in accordance with the specified authentication scheme. At decision block 506, if it is determined that the HTTP stack is not configured with a handler for the specified authentication scheme, the process may flow to block 526, where the request message, or portions thereof, are passed to application 210. This provides application 210 with a mechanism for performing authentication of the received message.

The process may flow from block 516 to block 518, where a security token may be extracted from the received message. In one embodiment, application 210 may be configured to perform at least some of the actions of HTTP stack 206 with respect to authentication of the request message. Specifically, the actions of blocks 518 and 520, and decision block 522 may include the actions of corresponding blocks 508, 510, and 512, respectively, as described herein. Thus, the process may flow from block 518 to block 520 to block 522, and then to block 410 or block 408, as described above for the corresponding blocks. In one embodiment, a failed authentication at decision block 522 may result in an injection of an HTTP error as described herein.

At least some of the mechanisms described herein enable relying party 106 to have various configurations with respect to a received request message. In one configuration, an authentication module 208 of HTTP stack 206 may be configured to perform authentication of the received request. In one configuration, authentication module 208 may not be so configured, and the message is passed to application 210 where application authentication module 212 performs authentication. In one configuration, authentication module 208 may perform a portion of the authentication actions and authentication module 212 may perform another portion. Application 210 may thus be installed on a variety of computing systems 200, and may operate with the various HTTP stack configurations.

Figure 6:
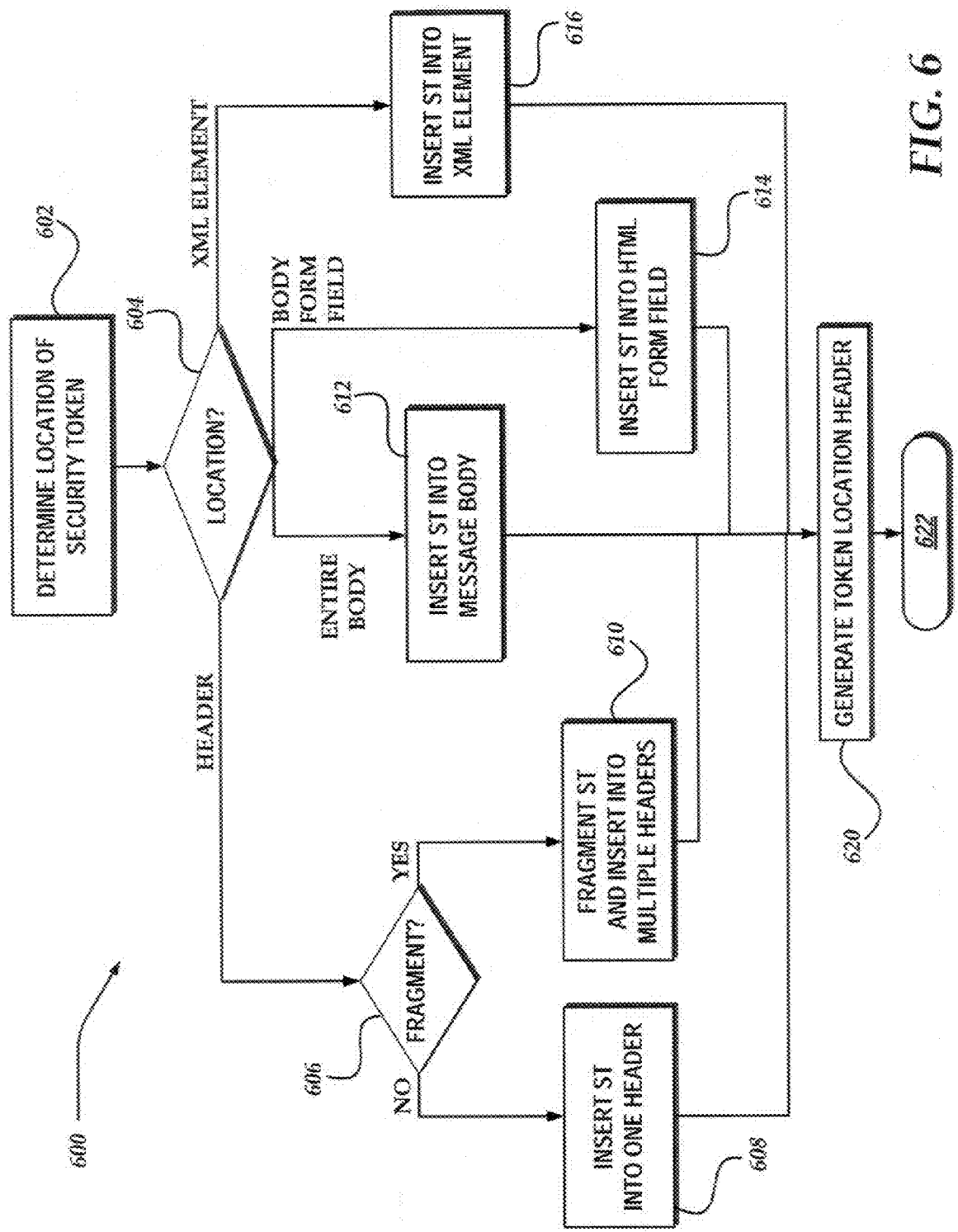
FIG. 6 is a flow diagram illustrating a process of inserting a security token into an HTTP message, in accordance with an example embodiment.

FIG. 6 is a flow diagram illustrating a process 600 of inserting a security token into an HTTP message, in an example embodiment. Process 600 illustrates at least some of the actions of blocks 418, as discussed above. The illustrated portions of process 600 may be initiated at block 602, where one or more locations of the security token may be determined. In one implementation, a security token may be configured to be in one or more HTTP headers or one of three locations in the message body. At decision block 604, the process may branch to one of four blocks to handle respective location options. One such location is in one or more HTTP headers. If it is determined that this is the location, the process may flow to decision block 606, where a determination is made of whether to fragment the security token. In one embodiment, this determination is made based on the size of the security token. If it is determined at decision block 606 that the security token may be inserted into one header, the process may flow to block 608, where the security token is inserted into one HTTP header. The process may flow to a block 620. In one embodiment, at block 620, an HTTP token location header is generated with a specification of the security token location. The process may then flow to done block 622 and exit or return to a calling program, such as block 418. If, at decision block 606, it is determined that fragmentation is to be performed, the process may flow to block 610, where fragmentation of the security token is performed, multiple HTTP token headers are generated, and a fragment of the security token is inserted into each header. The process may then flow to block 620, where a token location header may be generated. At block 620, if the security token is fragmented, a token location header may specify the number of fragments and the size of each fragment. The process may flow to done block 622.

At decision block 604, it may be determined that the entire body of the HTTP message is to contain the security token. If this is determined, the process may flow to block 612, where the security token is inserted into the body. The process may then continue at block 620, where a token location header may be generated.

At decision block 604, it may be determined that the security token is to be located in an HTML form field of the received message. If this is determined, the process may flow to block 614, where the specified form field may be generated and the security token is inserted into it. The process may then continue at block 620, where a token location header may be generated.

At decision block 604, it may be determined that the security token is to be located in a specified XML element within the message body. If this is determined, the process may flow to block 616, where the specified XML element is generated and the security token is inserted into it. The process may then continue at block 620, where a token location header may be generated.

FIG. 7 is a flow diagram illustrating a process 700 of extracting a security token from an HTTP message, in an example embodiment. Process 700 illustrates at least some of the actions of blocks 508 and 518, as discussed above. The illustrated portions of process 700 may be initiated at block 702, where one or more locations of the security token may be determined. This may include examining a token location header that specifies the location of the token and, if it is fragmented, the number of fragments. In one implementation, a security token may be configured in any of four locations. At decision block 704, the process may branch to one of four blocks to handle respective location options. One such location is in one or more HTTP headers. If it is determined that this is the location, the process may flow to block 706, where a fragment of the security token is extracted from each header. If there is more than one fragment in more than one corresponding header, they are assembled to form the security token. The process may then continue at block 510 or 520 of FIG. 5.

At decision block 704, it may be determined that the entire body of the HTTP message contains the security token. If this is determined, the process may flow to block 708, where the security token is extracted from the body. The process may then continue at block 510 or 520.

At decision block 704, it may be determined that the security token is located in a specified HTML form field of the received message. If this is determined, the process may flow to block 710, where the security token is extracted from the specified form field. The process may then continue at block 510 or 520.

At decision block 704, it may be determined that the security token is located in a specified XML element within the message body. If this is determined, the process may flow to block 712, where the security token is extracted from the XML element. In one embodiment, extracting the XML element is performed by using a query specified in a token location header field. The process may then continue at block 510 or 520.

Processes 600 and 700 enable a number of options for location of a security token. For example, if the security token is too long to fit within a single HTTP header based on a specified HTTP header size restriction, it may be located in multiple HTTP headers. If the security token is too long to fit within multiple HTTP headers, based on HTTP constraints on a total header size, it may be located in the message body. The process further accommodates message bodies of different protocols, including HTML or XML. For example, a request may be in the form of an HTTP POST message.

Example Messages

This section describes examples of message contents that may be used to implement the messages described in environment 300, or other messages. These descriptions are to be understood as a set of examples. In various embodiments, these examples may be used in their entirety or in a subset thereof to form an authentication scheme, or protocol. In various embodiment, keywords or parameters may differ and still be employed to perform at least some of the mechanisms described herein. In one embodiment, none of these examples are used.

In one embodiment, the messages as described herein are used to form a protocol that is an extension to the authentication protocol of RFC 2617. The name "WSSEC" is used herein as a moniker for this protocol. The protocol herein described facilitates a variety of schemes for authenticating HTTP requests. It also defines a set of new HTTP extension headers and their semantics for use with the WSSEC protocol in a way such that the protocol may be implemented at the HTTP layer in the stack or in the application above the HTTP layer.

As discussed herein, various actions described herein may be performed by application authentication module 212 (FIG. 2) of application 210 or authentication module 208 of HTTP stack 206. In one embodiment, the messages and message headers are designed to accommodate implementations by application 210 or HTTP stack 206, such that an application may implement at least some of the mechanisms in an environment in which the HTTP stack does not recognize or process at least some of the headers or parameters. For example, some Web servers are configured to strip off standard HTTP authentication headers if they do not recognize the authentication scheme specified. In such an environment, the custom headers defined herein are still available to the application to enact the authentication protocol.

In some environments, the HTTP stack may be configured to recognize and process the authentication schemes described herein, freeing the application from performing these tasks. Thus, a requester may interact with various relying parties in the same manner, regardless of whether the relying parties have HTTP stacks that recognize or implement the headers described herein. Similarly, a relying party may interact with various requesters without regard to whether each requester's HTTP stack implements the HTTP headers described herein. Additionally, an application may be deployed in an environment in which the HTTP stack does not process the authentication scheme. If the HTTP stack is updated to process the authentication scheme, the application may continue to function, allowing the HTTP stack to perform the authentication actions.

Table 1 illustrates HTTP headers that may be used in each of the described messages. In each message, additional HTTP headers not described may be included.

TABLE 1

| Authentication Headers | |
| --- | --- |
| Unauthorized Message 312 | WWW-Authenticate |
| | X-WSS-Authenticate |
| Request Message 318 | Authorization |
| | X-WSS-Security |
| | X-WSS-TokenLoc |
| | X-WSS-Token |
| | X-WSS-Digest |
| Response Message 320 | X-WSS-AuthInfo |

Table 2 illustrates, for each HTTP header of Table 1, a set of parameters that may be included in the header. In the illustrated embodiment, many of the parameters are in a "name=value" format in which a keyword representing the parameter name is followed by a value for the parameter. In one embodiment, the parameters listed within brackets are considered optional, though in various embodiments, the protocol may differ.

In the discussion that follows, headers are used to aid in identifying header descriptions, though the use of a header does not suggest that the associated text is limited to the header, or that description of the header is limited to the associated text.

TABLE 2

Header Parameters

| | |
|---|---|
| WWW-Authenticate: WSSEC | [realm="realm-spec",] |
| | [profile="token-profile"] |
| X-WSS-Authenticate: | nonce="nonce-value", |
| | [sigmethod="signature-method", ] |
| | [sigusage="signature-usage",] |
| | [version="protocol-version"] |
| Authorization: WSSEC | [realm="realm-spec",] |
| | [profile="token-profile"] |
| X-WSS-Security: | timestamp="timestamp-value", |
| "token-profile" | nonce="nonce-value", |
| | [ sigmethod="signature-method",] |
| | [sigusage="signature-usage", ] |
| | [signature="signature-value",] |
| | [version="protocol-version"] |
| X-WSS-TokenLoc: | [frags="fragment-count",] |
| "location-type" | [ fragsize="fragment-size"] \| |
| | fieldname="form-field-name" \| |
| | [querytype="query-type", ]query= |
| | "query-string" |
| X-WSS-Token<n>: | "token-fragment-content" |
| X-WSS-Digest: | [method="digest-method",] |
| | digest="content-digest" |
| X-WSS-AuthInfo: | [nextnonce="nonce-value",] |
| | [ctxtoken="context-token", |
| | ctxtokensecret="context-token-secret"] |

WWW-Authenticate Header

In one embodiment, use of the WWW-Authenticate header with the keyword "WSSEC" in unauthorized message 312 indicates support for at least some of the mechanisms described herein.

The WWW-Authenticate header includes one or more authentication specifications. In this HTTP header, "realm-spec" may specify a protection realm. The parameter "token-profile" may specify a name of a security token profile. A security token profile identifies a format and corresponding algorithm for generating a direct security token. Examples of token profiles include specification Kerberos v. 5 service ticket profile, x.509v3 certificate profile, SAML v1.1 assertion, SAML v2.0 assertion, or a security context token issued by the relying party.

X-WSS-Authenticate Header

In one embodiment, the X-WSS-Authenticate header may be used by a replying party in unauthorized message 312 to convey authentication specifications, and more specifically, signature specifications that the requester is instructed to use in a subsequent message. The parameters may be defined as follows:

nonce-value: a base64 encoded nonce value.

signature-method: an optional specification of a signature algorithm used to sign a request.

signature-usage: an optional specification of the semantic usage or purpose that the relying party wants the requester to convey through the signature in the request.

version: an optional specification of a protocol version.

Following is an example embodiment of at least a portion of unauthorized message 312 that includes the WWW-Authenticate and X-WSS-Authenticate headers:

```
HTTP/1.1 401 Unauthorized
WWW-Authenticate: WSSEC realm="contoso.com", profile="samlv1.1"
X-WSS-Authenticate:   nonce="uV3F3YluFJax1c",
                      sigmethod="hmac-sha1",
                      sigusage="auth-int",
                      version="1.0"
```

Authorization Header

In one embodiment, the Authorization header is included by the requester in request message 318 to indicate compliance with the WSSEC protocol for authentication. The "realm-spec" and "token-profile" parameters may each be optional. In one embodiment, each of these fields, if included, match the corresponding fields in the WWW-Authenticate header received from the relying party in unauthorized message 312.

X-WSS-Security Header

In one embodiment, the X-WSS-Security header may be used in request message 318 to provide security information relating to a digital signature and to indicate compliance with the signature specifications received from the relying party. This header carries the protocol parameters that allow the requester to provide proof-of-possession of the security token that is used for request authentication. More specifically, it may include a digital signature using key material that is present in the authentication token that cryptographically binds the token to the request. In an example embodiment, the parameters are defined as follows.

"timestamp-value". This specifies an integer timestamp value.

"nonce-value": This may be a base64 encoded nonce value.

"signature-method". This optionally specifies a signature algorithm used to sign the request.

"signature-usage". This is an optional specification of the semantic usage or purpose that the requester wishes to convey through the signature in the request.

"signature-value". This is an optional value of a digital signature of the request.

"protocol-version". This is an optional specification of a protocol version.

The nonce and timestamp provide assurance that the request has not been submitted before, discouraging request replay attacks. The nonce may be a random number enabling a relying party to determine whether multiple messages with identical timestamps are replays or duplicates. Following is an example of portions of a request message 318 that includes the Authorization and X-WSS-Security headers.

```
POST /resource/add.aspx HTTP/1.1
Host: www.contoso.com
Content-Type: application/xml
Authorization: WSSEC realm="contoso.com", profile="samlv1.1"
X-WSS-Security:    samlv1.1
                   nonce="uV3F3YluFJax1c",
                   timestamp="1288542340",
                   sigmethod="hmac-sha1",
                   sigusage="auth-int",
                   signature="gU53F679YHluax2dcJH...",
                   version="1.0"
```

X-WSS-TokenLoc

In one embodiment, the X-WSS-TokenLoc header specifies a location of a security token within an HTTP message. The security token may be a direct or an indirect security token. The parameters may be defined as follows:

"location-type". This specifies the location of the token. It may be one of the keywords "header," "body," "body-form," or "body-xml."

"fragment-count" and "fragment-size". These parameters are used in conjunction with the "header" location and specify the number of fragments and the size of each fragment, respectively.

"form-field-name". This is used in conjunction with the "body-form" location. It specifies the field name in an HTML form.

"query-type" and "query-string". These parameters are used in conjunction with the "body-xml" location, and may specify a query to extract an xml element.

X-WSS-Token Header

In one embodiment, the X-WSS-Token header is used to communicate a security token if the value of the "location-type" parameter of the X-WSS-TokenLoc header is specified as "header", as discussed herein. The specification of the direct security token may be specified by the "token-profile" parameter in the Authorization header, and may comply with authentication specifications received from the relying party.

A security token may be in one fragment or divided into multiple fragments, each fragment carried by a different X-WSS-Token header field. The number of fragments may be indicated by the "fragment-count" field of the X-WSS-TokenLoc header.

In one embodiment, the name of each X-WSS-Token header is formed by concatenating the base "X-WSS-Token" with an integer-valued suffix N=1, . . . , frags, where frags is the number of fragments into which the token is divided, as specified by the fragment-count" field of the X-WSS-Token-Loc header. For example, the header named "X-WSS-Token1" may carry the first token fragment; the header named "X-WSS-Token2" may carry the second token fragment, and so on. In one embodiment, the recipient of a token sent through this header collects all headers with the "X-WSS-Token" base name and concatenate their content in sequence to reconstitute the content of the whole token.

X-WSS-Digest Header

In one embodiment, the X-WSS-Digest header may be used to communicate a digest of the body carried in the message. Portions of at least some HTTP headers may be included in the digest. In particular, at least some of the HTTP headers related to authentication may be included. This may include the "X-WSS" headers listed in Table 2. Prior to computing a digest, the content that is to be processed may be translated into a canonical form. Canonicalization of the content may include transformations such as putting all characters into lower case, removing whitespace, sorting headers or parameters alphabetically, normalizing URLs, or the like. The digest provides integrity protection and facilitates verification of the message body or headers. In one embodiment, this header is used in conjunction with the X-WSS-Security header with a signature that covers the message body, as indicated by the "sigusage" parameter. In one embodiment, the parameters of this message are used as follows:

"digest-method". This string specifies a hash algorithm used to compute the digest of the body.

"content-digest". This is a binary-valued parameter specifies the base64-encoded digest value.

Following is an example of an X-WSS-Digest header that may be used, in which the SHA-1 digest method is specified.

X-WSS-Digest: method="sha1" digest= "3F679YHluax2dc"

X-WSS-AuthInfo Header

In one embodiment, the X-WSS-AuthInfo header may be used by a relying party in response message 320, after a request authentication succeeds, to communicate additional parameters to the requester relating to the authentication. These parameters may impact or change the behavior of any subsequent request authentication. In one embodiment, the parameters of this message are used as follows:

"nonce-value". This specifies a new nonce value to be used for the next request authentication. If this parameter is present, it instructs the requester to use this value in the X-WSS-Security header of the next request message to that relying party.

"context-token". This parameter contains a security context token, such as an encrypted cookie, that represents the security context established for the requester by the relying party. This parameter instructs the requester that this security context token is to be used in future requests. The cryptographic key to be used to provide proof of possession of the security context is specified in the "context-token" parameter.

"context-token-secret". This parameter is used in conjunction with the "context-token" parameter. It specifies a secret symmetric cryptographic key that may be used by the requester to prove ownership of the security context represented by the "context-token" parameter.

A relying party may send the "nonce-value" parameter as a means of implementing one-time nonces. A relying party may use the "context-token" and "context-token-secret" parameter combination to establish a security context for the requester so that future authentications within that context do not have to include the security tokens (for example, if the token size is large) that were submitted with the initial request. In one embodiment, a requester and a relying party use transport-layer security such as SSL or TLS to protect the confidentiality of this exchange.

Following is an example of a response message 320 that includes the X-WSS-AuthInfo header with a security context token and a corresponding proof key.

X-WSS-AuthInfo: ctxtoken="fg75kVB890Uwstm . . . ", ctxtokensecret="gU59cJH . . . "

Figure 8:
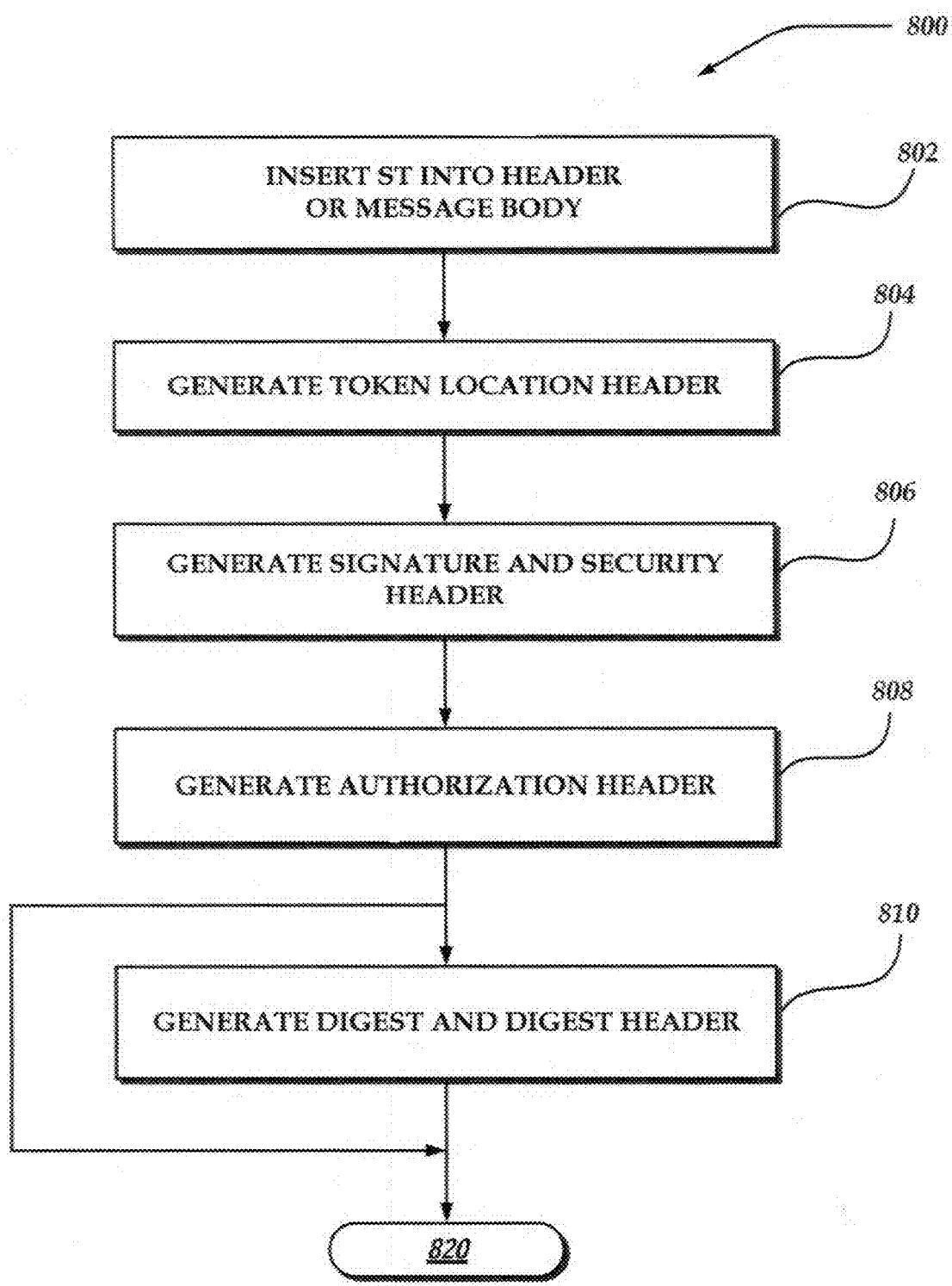
FIG. 8 is a flow diagram illustrating a process of generating an HTTP message, in an example embodiment.

FIG. 8 is a flow diagram illustrating a process 800 of generating an HTTP message, in an example embodiment. Process 800 illustrates at least some of the actions of block 418, as discussed above. The illustrated portions of process 800 may be initiated at block 802, where a security token is inserted into the message body or one or more HTTP headers. Actions of block 802 are discussed in FIG. 6.

At block 804, a token location header may be generated, including a specification of the location of the security token. Actions of block 804 are discussed in FIG. 6. Table 2 and associated discussion describe one embodiment of a token location header.

At block 806, a digital signature may be generated and inserted into a security header. Table 2 and associated discussion describe one embodiment of a security header.

At block 808, an authorization header may be generated. Table 2 and associated discussion describe one embodiment of an authorization header.

At block 810, a digest may be generated and inserted into a digest header. Table 2 and associated discussion describe one embodiment of a digest header. Process 800 may flow to block 820 and exit or return to a calling program.

In one embodiment, the actions of block 810 are not performed, and a digest header is not generated. In various embodiments, other headers described herein may be excluded from a request header. The sequence of the blocks and associated actions of FIG. 8 may be in any of a variety of orderings, and the process is not limited to the illustrated sequence.

As discussed herein, in one embodiment, a requester may employ at least some of the mechanisms and protocols described herein to request a token from an identity provider. Following is an example of such use, which may form at least a portion of request ST message 314. In this example, the HTTP POST method is used for the request.

```
POST /sts/issue HTTP/1.1
Host: contoso.com
Authorization: WSSEC profile=samlv1.1"
Content-Type: application/xml
X-WSS-Security:    nonce="uV3F3YluFJax1c",
timestamp="1288542340",
      sigmethod="hmac-sha1", sigusage="auth-int",
      signature="gU53F679YHluax2dcJH...", version="1.0"
X-WSS-Digest: method="sha1" digest="3F679YHluax2dc"
X-WSS-TokenLoc: header
X-WSS-Token1: w87xzV6Flm53KluDJay3d...
<RequestSecurityToken>
      <AppliesTo> xyz </AppliesTo>
</RequestSecurityToken>
```

In another example, instead of an XML-based payload in the POST body a form-based payload may be used by defining a mapping between XML tag names and form field names. For example, the above request using a form-based payload is shown below.

```
POST /sts/issue HTTP/1.1
Host: contoso.com
Authorization: WSSEC profile=samlv1.1"
Content-Type: application/xml
X-WSS-Security:    nonce="uV3F3YluFJax1c",
timestamp="1288542340",
      sigmethod="hmac-sha1", sigusage="auth-int",
      signature="gU53F679YHluax2dcJH...", version="1.0"
X-WSS-Digest: method="sha1" digest="3F679YHluax2dc"
X-WSS-TokenLoc: header
X-WSS-Token1: w87xzV6Flm53KluDJay3d...
AppliesTo=xyz
```

It will be understood that each block of the flowchart illustrations of FIGS. 4-8, and combinations of blocks in the flowchart illustrations, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-readable storage medium comprising computer program instructions for processing messages exchanged between a requester and a server, the program instructions executable by a processor to perform actions including:

a) receiving, from the server, a server message comprising one or more HTTP headers, the one or more HTTP headers including authentication specifications;

b) in response to receiving the server message, generating a request message that complies with the authentication specifications, the request message comprising:

i) a plurality of HTTP headers;

ii) a security token including a cryptographic key, the security token complying with a security token specification in the authentication specifications; and iii) an HTTP token location header, of the plurality of HTTP headers, including a security token location specification, the security token location specification identifying a location of the security token;

v) an HTTP security header, of the plurality of HTTP headers, including a digital signature;

c) selectively determining the location of the security token to be in a message body;

d) selectively determining the location of the security token to be in the plurality of HTTP token headers; and e) generating a digital signature of at least a portion of the request message based on a signature specification of the authentication specifications, and inserting the digital signature into the HTTP security header.

2. The computer-readable storage medium of claim 1, selectively determining the location of the security token to be in the message body based on a size of the security token.

3. The computer-readable storage medium of claim 1, the actions further including:

a) selectively, based on a size of the security token, fragmenting the security token into at least two HTTP token headers of the plurality of HTTP headers, and generating the token location specification to include a number of fragments of the security token; and b) selectively, based on the size of the security token, inserting the security token into exactly one HTTP token header of the plurality of HTTP headers.

4. The computer-readable storage medium of claim 1, the security token is a direct security token.

5. The computer-readable storage medium of claim 1, generating the request message comprising generating the one or more HTTP headers by employing HTTP header names that enable an HTTP stack of the server to authenticate the message by extracting and verifying the security token, and enable an application of the server to authenticate the message by extracting and verifying the security token if the HTTP stack of the server is not configured to extract and verify the security token.

6. The computer-readable storage medium of claim 1, the actions further comprising: receiving, from the server, a second server message comprising an HTTP header including a context token; sending a second request message to the server, the second request message including the context token and not including a second security token.

7. The computer-readable storage medium of claim 1, the request message is an HTTP POST message, the actions further including inserting the security token in an HTML form field in the message body.

8. A computer-readable storage medium comprising computer program instructions for processing messages exchanged between a requester and a server, the program instructions executable by a processor to perform actions including:

a) sending, to the requester, a server message comprising one or more HTTP headers, the one or more HTTP headers including one or more authentication specifications;
b) receiving, from the requester, a request message comprising a message body and a plurality of HTTP headers, the plurality of HTTP headers including:
   i) a security token location specification identifying a location of a security token; and
   ii) a digest comprising a cryptographic representation of at least a portion of the message body and at least a portion of the plurality of HTTP headers;
c) if the security token location specification indicates that the security token is in the plurality of HTTP headers, extracting the security token from the plurality of HTTP headers;
d) if the security token location specification indicates that the security token is in the message body, extracting the security token from the message body;
e) extracting the digest from the plurality of HTTP headers;
f) verifying that the digest accurately represents the message body and the at least a portion of the HTTP headers; and
g) generating a response message based on the security token.

9. The computer-readable storage medium of claim 8, the actions further including:
a) if the security token location specification indicates that the security token is fragmented across at least two of the plurality of HTTP headers, extracting each fragment of the security token and assembling the fragments; and
b) if the security token locations specification indicates that the security token is in exactly one HTTP token header of the plurality of HTTP headers, extracting the security token from the HTTP token header.

10. The computer-readable storage medium of claim 8, the actions further including:
a) inserting, into the authentication specifications, a specification of a security token format; and
b) verifying that the security token is in the specified security token format and that the security token was issued by a trusted identity provider.

11. The computer-readable storage medium of claim 8, the server message is an HTTP error message, the actions further including inserting in the one or more authentication specifications an indication that the server authenticates received messages by processing each received HTTP authentication header of a set of HTTP authentication headers, the set of HTTP authentication headers including:
a) an HTTP token location header specifying the location of the security token, the location indicating that the security token is in one HTTP header, a plurality of HTTP headers, or the message body;
b) one or more HTTP security token headers including at least a fragment of the security token;
c) a digest token including a cryptographic representation of at least a portion of the message body and at least a portion of the plurality of HTTP headers; and
d) a security token that includes a digital signature representing at least a portion of the received message.

12. The computer-readable storage medium of claim 8, the computer program instructions employed by an HTTP stack to authenticate each of the messages prior to passing each message to an application.

13. The computer-readable storage medium of claim 8, the computer program instructions employed by an application to authenticate each of the messages after receiving each message from a server-side HTTP stack.

14. The computer-readable storage medium of claim 8, the one or more authentication specifications including a digital signature specification, the actions further including verifying that the plurality of HTTP headers received from the requester include a digital signature that complies with the digital signature specification.

15. The computer-readable storage medium of claim 8, the actions further comprising:
a) inserting, into the response message, a context token;
b) receiving a second request message from the requester, the second request message not including a security token;
c) verifying that the second request message includes the context token; and
d) generating a second response message based on verifying that the second request message includes the context token.

16. A computer-based system for processing messages exchanged between a requester and a server, comprising a message processor configured to perform actions including:
a) in response to a server message comprising one or more HTTP headers, the one or more HTTP headers including authentication specifications, generating a request message that complies with the authentication specifications;
b) inserting, into the request message, a security token conforming to a security token specification in the authentication specifications;
c) inserting, into the request message, an HTTP token location header that specifies a location of the security token;
d) inserting, into the request message, an HTTP digest header that includes a digest comprising a cryptographic representation of at least one HTTP header; and
e) inserting, into the request message, a security header that includes a digital signature of at least a portion of the request message.

17. The computer-based system of claim 16, the actions further comprising determining a location of the security token based on a size of the security token, determining the location including determining whether the security token is to be in one or more HTTP headers or a message body.

18. The computer-based system of claim 16, the actions further comprising determining a location of the security token based on a size of the security token, determining the location including determining whether the security token is to be in exactly one HTTP header, a plurality of HTTP headers, or a message body.

19. The computer-based system of claim 16, further comprising a second message processor that receives the request message, selectively extracts the security token from a message body based on the HTTP token location header, selectively extracts the security token from exactly one HTTP header based on the HTTP token location header, and selectively extracts a plurality of fragments of the security token from a plurality of HTTP headers based on the HTTP token location header.

20. The computer-based system of claim 16, the actions further comprising inserting the security token into a message body, the HTTP token location header specifying that the entire message body contains the security token.

* * * * *